(12) United States Patent
Kamochi et al.

(10) Patent No.: US 12,434,646 B2
(45) Date of Patent: Oct. 7, 2025

(54) MOVING BODY SETTING APPARATUS, MOVING BODY, MOVING BODY SETTING SYSTEM, METHOD AND COMPUTER READABLE STORAGE MEDIUM

(71) Applicant: HONDA MOTOR CO., LTD., Tokyo (JP)

(72) Inventors: Shohei Kamochi, Tokyo (JP); Naoki Kikuchi, Tokyo (JP); Yunan Cai, Tokyo (JP); Kyoko Iwashima, Tokyo (JP); Naoki Shibata, Tokyo (JP); Yukiya Ishikawa, Dublin, OH (US); Nathaniel Diedrich, Dublin, OH (US); Ross Miller, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 18/127,669

(22) Filed: Mar. 29, 2023

(65) Prior Publication Data

US 2024/0326729 A1 Oct. 3, 2024

(51) Int. Cl.
*B60R 16/03* (2006.01)
*B60R 16/037* (2006.01)
*B60R 25/24* (2013.01)

(52) U.S. Cl.
CPC .......... *B60R 16/037* (2013.01); *B60R 25/241* (2013.01); *B60R 2325/20* (2013.01)

(58) Field of Classification Search
CPC .............................. B60R 16/037; B60R 25/24
See application file for complete search history.

(56) References Cited

U.S. PATENT DOCUMENTS 6,741,920 B1\* 5/2004 Otto ...................... B60R 16/037
340/5.6
6,812,942 B2\* 11/2004 Ribak .................... B60K 35/00
715/705

(Continued)

FOREIGN PATENT DOCUMENTS

JP 2011026768 A 2/2011
JP 2014133537 A 7/2014

(Continued)

OTHER PUBLICATIONS

Office Action issued for counterpart Japanese Application No. 2024-042211, transmitted from the Japanese Patent Office on Jun. 10, 2025 (drafted on Jun. 4, 2025).

*Primary Examiner* — Tan Q Nguyen (57) ABSTRACT

A moving body setting apparatus can receive an operation terminal ID transmitted from an operation terminal holding the operation terminal ID, and includes: a storage unit storing first information associating the operation terminal ID of the operation terminal with a user ID of a moving body, and second information associating the user ID with setting information of equipment included in the moving body; a user selection unit that selects a user of the moving body, based on a user operation, or based on the operation terminal ID received from the operation terminal, and the first information; a moving body setting unit that acquires, from the second information, setting information of the equipment associated with a user ID of a user selected by the user selection unit, and sets the equipment based on the acquired setting information; and an update unit that updates, when switching of user is performed by the user selection unit based on the user operation, a user ID associated with the operation terminal ID received from the operation terminal in the first information, with a user ID of a user after the switching.

15 Claims, 8 Drawing Sheets

(56) References Cited

U.S. PATENT DOCUMENTS

| | | | |
|---|---|---|---|
| 2010/0036560 A1* | 2/2010 | Wright | B60R 16/037 |
| | | | 701/36 |
| 2010/0075655 A1* | 3/2010 | Howarter | H04M 1/72415 |
| | | | 455/420 |
| 2010/0222939 A1* | 9/2010 | Namburu | B60R 16/037 |
| | | | 701/1 |
| 2020/0068400 A1* | 2/2020 | Ramic | H04L 63/107 |
| 2020/0353882 A1* | 11/2020 | Beiser | G06Q 20/363 |
| 2023/0174080 A1* | 6/2023 | Jeong | B60W 50/085 |
| | | | 701/49 |

FOREIGN PATENT DOCUMENTS

| | | |
|---|---|---|
| JP | 2015052223 A | 3/2015 |
| JP | 2017144834 A | 8/2017 |
| JP | 2018028192 A | 2/2018 |
| JP | 2019156155 A | 9/2019 |

* cited by examiner

FIG.1

| OPERATION TERMINAL ID | USER ID |
|---|---|
| 1 | A |
| 2 | C |

FIG.2

| USER ID | SETTING INFORMATION |
|---|---|
| A | SETTING INFORMATION A |
| B | SETTING INFORMATION B |
| C | SETTING INFORMATION C |
| D | SETTING INFORMATION D |
| E | SETTING INFORMATION E |
| X | SETTING INFORMATION X |

FIG.3

| USER ID | AUTHENTICATION INFORMATION |
|---|---|
| A | AUTHENTICATION INFORMATION A |
| B | AUTHENTICATION INFORMATION B |
| C | AUTHENTICATION INFORMATION C |
| D | AUTHENTICATION INFORMATION D |
| E | AUTHENTICATION INFORMATION E |

FIG.4

| USER ID | USER TERMINAL INFORMATION |
|---|---|
| A | TERMINAL INFORMATION |
| B | TERMINAL INFORMATION |
| C | TERMINAL INFORMATION |
| D | TERMINAL INFORMATION |
| E | TERMINAL INFORMATION |

MOVING BODY SETTING APPARATUS, MOVING BODY, MOVING BODY SETTING SYSTEM, METHOD AND COMPUTER READABLE STORAGE MEDIUM

BACKGROUND

1. Technical Field

The present invention relates to a moving body setting apparatus, a moving body, a moving body setting system, a method, and a computer-readable storage medium.

2. Related Art

Patent documents 1, 2, and 5 described below discloses technologies related to smart devices for vehicles.

Patent document 3 described below discloses a technology that uses a smartphone for a user identification for a vehicle.

Patent document 4 described below discloses a technology that changes, in invalidating key information of an electronic key, the key information to an ID code different from key information that has been used so far.

PRIOR ART DOCUMENT

Patent Document

Patent Document 1: Japanese Patent Application Publication No. 2019-156155
Patent Document 2: Japanese Patent Application Publication No. 2011-026768
Patent Document 3: Japanese Patent Application Publication No. 2017-144834
Patent Document 4: Japanese Patent Application Publication No. 2015-052223
Patent Document 5: Japanese Patent Application Publication No. 2018-028192

By the way, there is a problem that it is not easy to set a plurality of pieces of equipment included in a moving body. The present application aims at enhancing operability for setting the plurality of pieces of equipment included in the moving body, to solve the problem described above. In addition, the present application further improves traffic safety to contribute to development of a sustainable transportation system.

DESCRIPTION OF EXEMPLARY EMBODIMENTS

Hereinafter, the present invention will be described through embodiments of the present invention, but the following embodiments do not limit the present invention according to claims. In addition, not all combinations of features described in the embodiment are essential to the solution of the invention.

Figure 1:
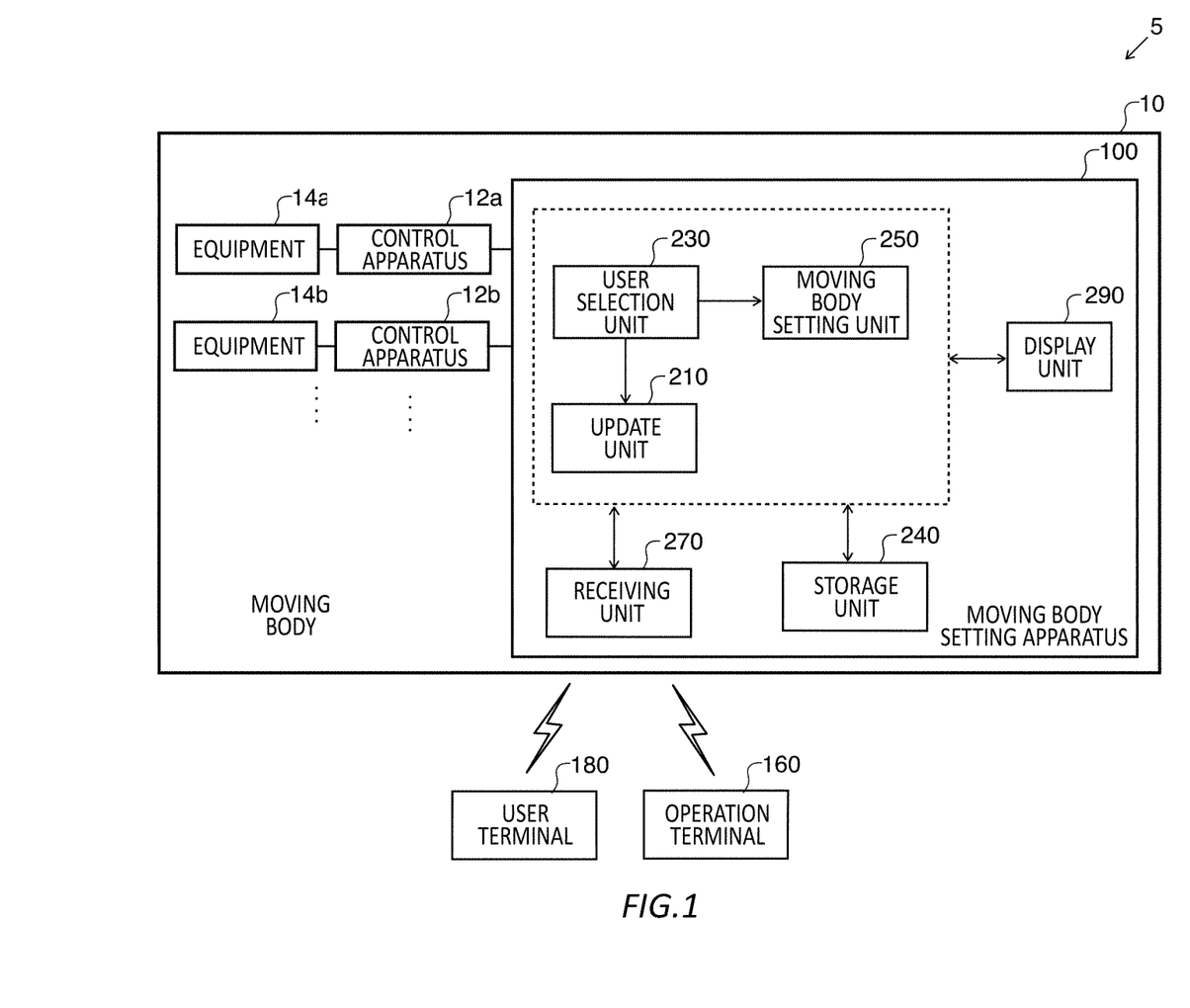
FIG. 1 conceptually shows a configuration of a moving body setting system 5 in an embodiment.

FIG. 1 conceptually shows a configuration of a moving body setting system 5 in an embodiment. The moving body setting system 5 includes a moving body 10, an operation terminal 160, and a user terminal 180.

The moving body 10 includes a plurality of pieces of equipment including equipment 14a and equipment 14b, a plurality of control apparatuses including a control apparatus 12a and a control apparatus 12b, and a moving body setting apparatus 100. The moving body setting apparatus 100 includes an update unit 210, a user selection unit 230, a moving body setting unit 250, a storage unit 240, a receiving unit 270, and a display unit 290.

In the present embodiment, the moving body 10 is a vehicle. In the present embodiment, the equipment 14a and the equipment 14b are pieces of equipment which are included in the moving body 10. The equipment 14a and the equipment 14b may be, for example, a seat position control apparatus, an air conditioner, or the like, which are included in the moving body 10. In the present embodiment, the equipment 14a and the equipment 14b may be collectively referred to as "equipment 14".

The operation terminal 160 is a device that is also called a smart key, an FOB key, a remote control key, or the like. The operation terminal 160 may be used to control an operation of the moving body 10. For example, a door of the moving body 10 may be opened and closed according to an operation of the operation terminal 160. The operation terminal 160 stores at least an operation terminal ID, and transmits the stored operation terminal ID to the moving body 10.

The user terminal 180 is, for example, a smartphone. The user terminal 180 may be a portable terminal other than a smartphone. The user terminal 180 may be a computing device with a communication function. The user terminal 180 may be a terminal such as a mobile phone, a PDA, a tablet computer, and a wearable computer.

The control apparatus 12a controls the equipment 14a. The control apparatus 12b controls the equipment 14b. The control apparatus 12a and the control apparatus 12b are, for example, ECUs (Electronic Control Unit). In the present embodiment, the control apparatus 12a and the control apparatus 12b may be collectively referred to as a "control apparatus 12". The moving body setting apparatus 100 and the control apparatus 12 transmit and receive setting information by a CAN (Controller Area Network) message.

The moving body setting apparatus 100 constitutes, for example, at least part of an IVI (In-Vehicle Infotainment) system. The display unit 290 displays image information which is provided to a user. The storage unit 240 is configured to include a non-volatile storage medium. The receiving unit 270 receives the operation terminal ID which is transmitted from the operation terminal 160. The receiving unit 270 receives information required for user authentication from the user terminal 180.

The moving body setting apparatus 100 is able to receive the operation terminal ID which is transmitted from the operation terminal 160 holding the operation terminal ID. Specifically, the moving body setting apparatus 100 receives the operation terminal ID transmitted from the operation terminal 160 through the receiving unit 270.

The storage unit 240 stores first information associating the operation terminal ID of the operation terminal 160 with a user ID of the moving body 10, and second information associating the user ID with setting information of the equipment 14 included in the moving body 10. The user selection unit 230 selects a user of the moving body 10, based on a user operation, or based on the operation terminal ID received from the operation terminal 160, and the first information.

The moving body setting unit 250 acquires, from the second information, setting information of the equipment 14 associated with a user ID of a user selected by the user selection unit 230, and sets the equipment 14 based on the acquired setting information. When switching of the user is performed by the user selection unit 230 based on the user operation, the update unit 210 updates a user ID which is associated with the operation terminal ID received from the operation terminal 160 in the first information, with a user ID of a user after the switching.

The storage unit 240 stores user information which includes a plurality of user IDs of users, the user IDs being able to be associated with the operation terminal ID. When the user ID which is associated with the operation terminal ID in the first information is deleted from the user information, the update unit 210 associates a predetermined default value with the operation terminal ID which is associated with the user ID that is deleted in the first information.

When the operation terminal ID received from the operation terminal 160 is associated with the default value in the first information, the moving body setting unit 250 sets the equipment 14 based on setting information associated with a user ID of a latest user who has used the moving body 10 in the second information. When the operation terminal ID received from the operation terminal 160 is associated with the default value in the first information, the update unit 210 updates the user ID which is associated with the operation terminal ID received from the operation terminal 160 in the first information, with a user ID of a latest user who has used the moving body 10.

The storage unit 240 further stores third information associating the user ID with a terminal ID of a mobile terminal authenticated in advance. On a condition that the moving body setting apparatus 100 is connected to a mobile terminal that is identified by a terminal ID which is associated with the user ID of the user selected by the user selection unit 230 in the third information, the moving body setting unit 250 acquires, from the second information, the setting information of the equipment 14 associated with the user ID of the user selected by the user selection unit 230, and sets the equipment 14 based on the acquired setting information.

Figure 2:
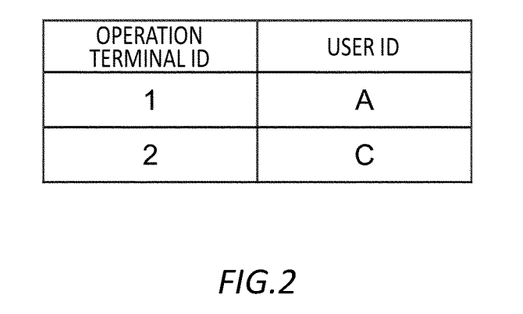
FIG. 2 shows an example of a data structure of first information which is stored in a storage unit 240.

FIG. 2 shows an example of a data structure of first information which is stored in a storage unit 240. The first information has the operation terminal ID and the user ID as data items. In the present embodiment, it is assumed that two operation terminals 160 can be used in the moving body 10 and the operation terminals 160 are identified by operation terminal IDs 1 and 2. In the present embodiment, it is assumed that it is possible to register up to five users who are able to use the moving body 10. With a purpose of avoiding a complication in the description, it is assumed that the user ID is constituted by one alphabetic character.

Figure 3:
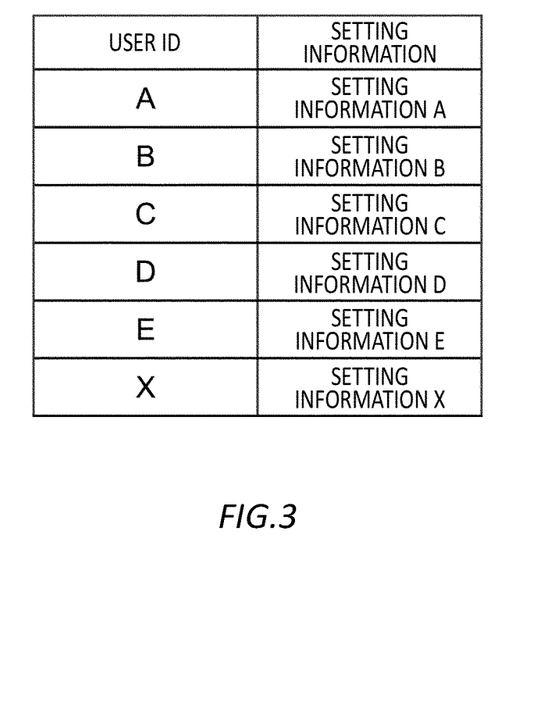
FIG. 3 shows an example of a data structure of second information which is stored in the storage unit 240.

FIG. 3 shows an example of a data structure of second information which is stored in the storage unit 240. The second information has the user ID and the setting information as the data items. The setting information may include, for example, a plurality of pieces of setting information for a plurality of pieces of equipment 14, such as a seat position, setting of the air conditioner, and a rearview mirror position.

As shown in FIG. 2, in a case where an operation terminal ID "1" and a user ID "A" are associated with each other, when the operation terminal ID "1" is received from the operation terminal 160, the moving body setting apparatus 100 can assume that the user who is identified by the user ID "A" uses the moving body 10. Therefore, when the operation terminal ID "1" is received from the operation terminal 160, the moving body setting apparatus 100 can eliminate a need for the user to perform an adjustment operation of the seat position or the like, by referring to the second information to control the seat position adjustment apparatus, based on the setting information A associated with the user ID "A", and setting the seat position to a seat position preset by the user who is identified by the user ID "A".

However, a family member of the user who is identified by the user ID "A" may borrow the operation terminal 160 to use the moving body 10. In this case, the family of user ID "A" needs to perform various adjustments of the seat positions or the like by themselves, or reset the association between the operation terminal ID and the user ID. The moving body setting system 5 provides means for being able to reduce a troublesome operation of the equipment for such a user.

In the present embodiment, it is assumed that five persons who are identified by user IDs "A" to "E" are able to use the moving body 10. A user ID "X" in the second information represents a default user.

Figure 4:
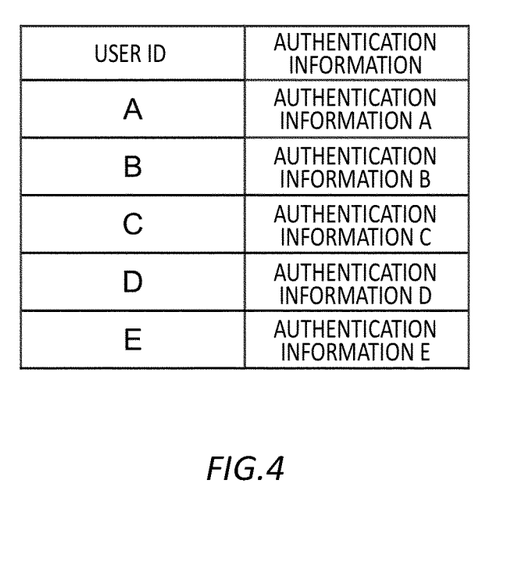
FIG. 4 shows an example of a data structure of user information which is stored in the storage unit 240.

FIG. 4 shows an example of a data structure of user information which is stored in the storage unit 240. The user information has the user ID and authentication information as the data items.

The authentication information is, for example, information which is referred to when user authentication is performed by a passcode such as a PIN code. The passcode may be determined when the user is registered with the moving body setting apparatus 100.

Figure 5:
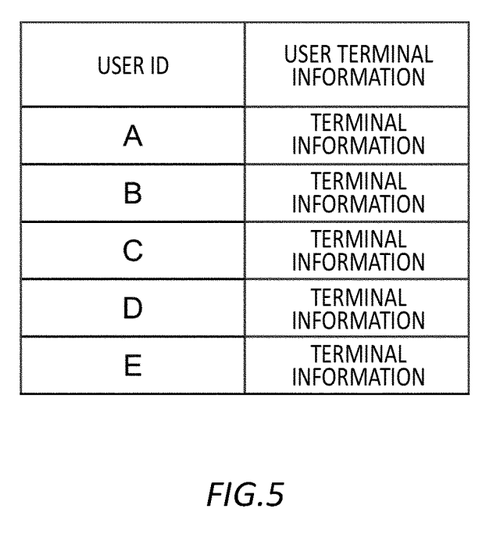
FIG. 5 shows an example of a data structure of third information which is stored in the storage unit 240.

FIG. 5 shows an example of a data structure of third information which is stored in the storage unit 240. The third information has the user ID and user terminal information as the data items.

The user terminal information is, for example, terminal information for authenticating the user terminal 180 recognized as a trusted user terminal by a corresponding user. The terminal information may be, for example, the authentication information such as a secret key which is used to authenticate the user terminal 180. For example, in a state in which the user is logged in by using the passcode, the terminal information is set by operations of performing pairing between the moving body setting apparatus 100 and the operation terminal 160 through a Bluetooth (registered trademark) connection or the like, and performing a registration as a trusted user terminal 180.

Figure 6:
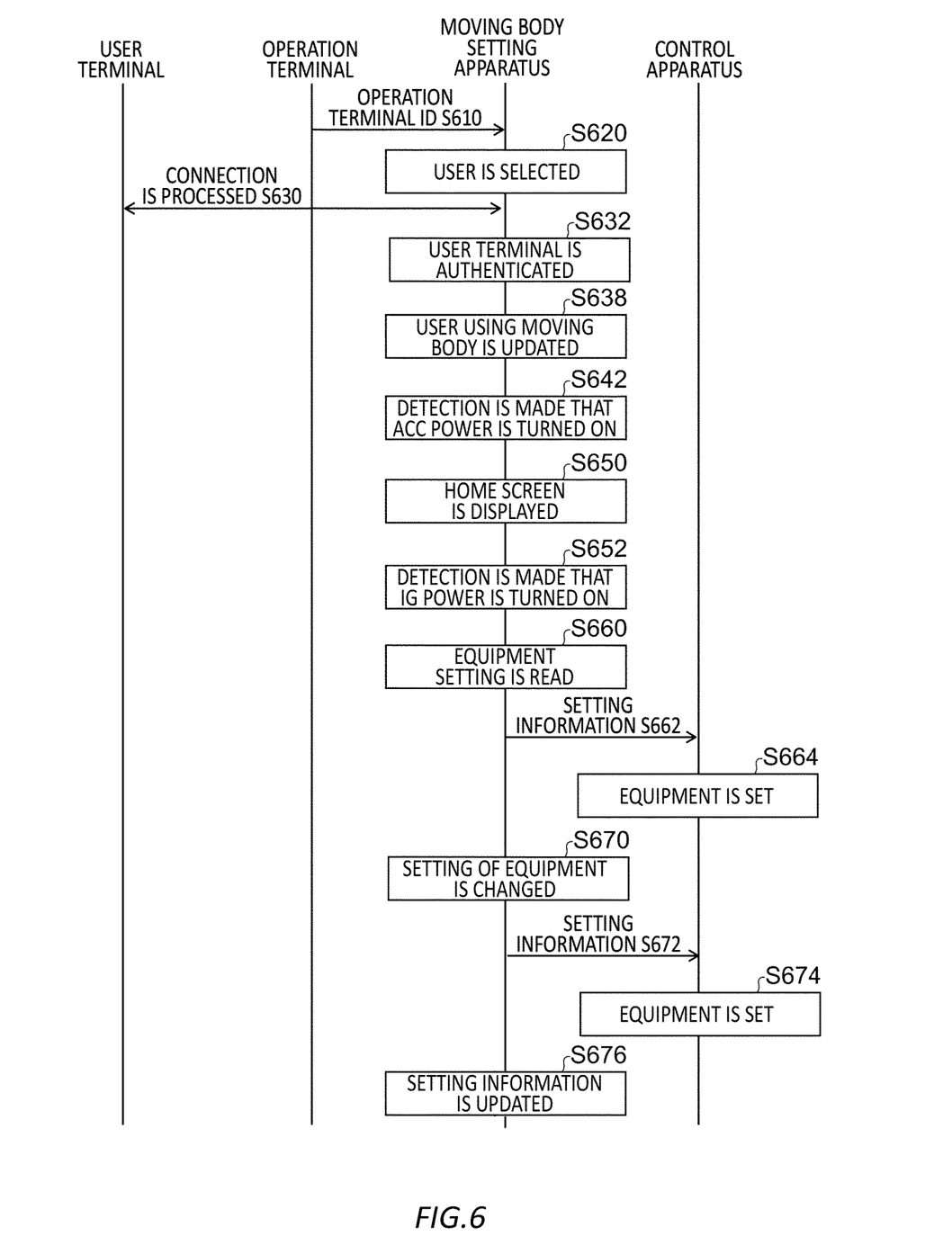
FIG. 6 shows examples of execution sequences of processes that are performed by a user terminal 180, an operation terminal 160, a moving body setting apparatus 100, and a control apparatus 12 according to an embodiment.

FIG. 6 shows examples of execution sequences of processes that are performed by a user terminal 180, an operation terminal 160, a moving body setting apparatus 100, and a control apparatus 12 according to an embodiment.

In a sequence of FIG. 6, it is assumed that the user who uses the moving body 10 uses the moving body 10 by using the operation terminal 160 having the operation terminal ID associated with their own user ID in the first information. In addition, it is assumed that the user ID of the user who uses the moving body 10 and the terminal information of the trusted user terminal 180 are already associated with each other in the third information.

In S610, the operation terminal 160 transmits the operation terminal ID to the moving body setting apparatus 100. In S620, the user selection unit 230 refers to the first information to select the user ID associated with the received operation terminal ID.

In S630, a connection is performed between the user terminal 180 and the moving body setting apparatus 100. The pairing has previously been completed between the user terminal 180 of the user who uses the moving body 10 and the moving body setting apparatus 100, and thus, the user ID selected by the user selection unit 230 and the terminal information of the user terminal 180 are already associated with each other, in a third authentication. Therefore, the moving body setting unit 250 determines that the user terminal 180 can be authenticated (S632) to update the user using the moving body 10 (S638).

In S642, when the user turns on power of an accessory, the moving body setting apparatus 100 detects that the power of the accessory is turned on, and causes the display unit 290 to display a home screen (S650). Through the home screen, the user is capable of equipment setting, user setting, or the like.

In S652, when detecting that IG power is turned on, the moving body setting apparatus 100 reads the equipment setting corresponding to the user ID selected in S620. For example, the moving body setting unit 250 refers to the second information to read the setting information associated with the user ID selected in S620. In S662, the moving body setting unit 250 transmits the setting information read in S660 to the control apparatus 12. In S664, the control apparatus 12 sets the equipment based on the received setting information.

When the user changes the setting of the equipment in S670, the moving body setting unit 250 transmits the changed setting information to the control apparatus 12 in S672, and the control apparatus 12 sets the equipment in S674. In S676, the update unit 210 updates the second information. For example, the update unit 210 reflects the setting changed in S670, in the second information, to the setting information associated with the user ID selected in S620.

With the sequence described with reference to FIG. 6, the user selection is automatically performed by the operation terminal 160 carried by the user, and the authentication is performed by using the user terminal 180. Then, when the IG power is turned on, the equipment 14 is set based on the setting information associated with the user. Therefore, it is not necessary to input the authentication information such as the passcode, and it is possible to smoothly set the equipment.

In the sequence of FIG. 6, for example, it is possible to delete the user through the home screen displayed on the display unit 290 in S650. For example, when the user with the user ID "A" performs an operation to delete the user with the user ID "C", the update unit 210 updates the user ID associated with the operation terminal ID, in the first information shown in FIG. 2, with "A" which is the user ID of the user currently using the moving body 10. In this manner, when the moving body 10 is next used by using the operation terminal 160 associated with the operation terminal ID "2", the setting for the user with the user ID "A" who used the moving body 10 most recently is reflected in the equipment 14. In this manner, it is not necessary to perform the operation to delete the user and then assign a user to the operation terminal 160.

On the other hand, when the user with the user ID "C" performs an operation to delete the user themself, the update unit 210 updates the user ID associated with the operation terminal ID, in the first information shown in FIG. 2, with "X" which is the user ID of the default user. In this manner, when the moving body 10 is next used by using the operation terminal 160 associated with the operation terminal ID "2", the setting for a predetermined default user is reflected in the equipment 14. In this manner, it is not necessary to perform the operation to delete the user and then assign a user to the operation terminal 160.

Figure 7:
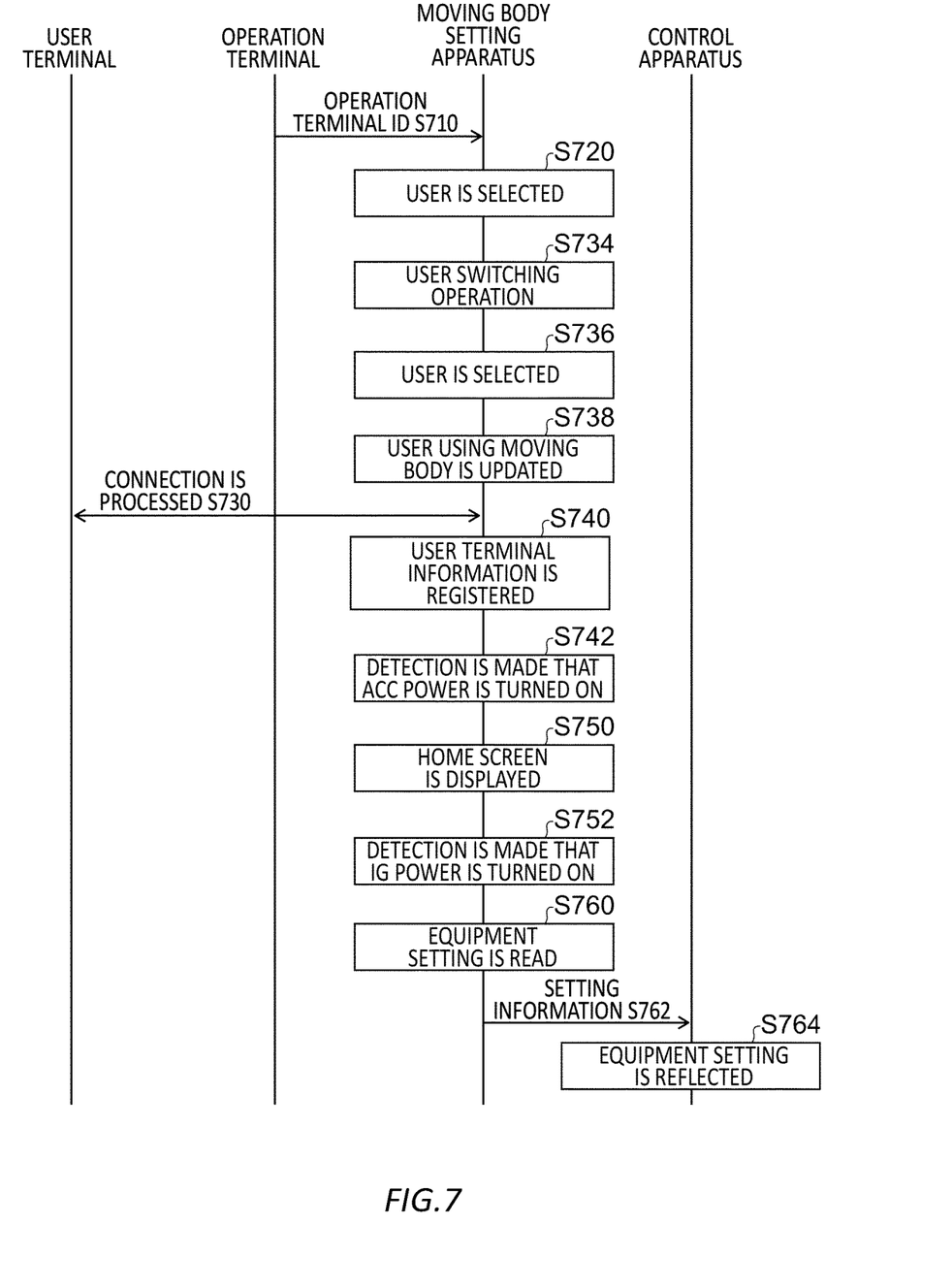
FIG. 7 shows examples of execution sequences of processes that are performed by the user terminal 180, the operation terminal 160, the moving body setting apparatus 100, and the control apparatus 12 according to an embodiment.

FIG. 7 shows examples of execution sequences of processes that are performed by the user terminal 180, the operation terminal 160, the moving body setting apparatus 100, and the control apparatus 12 according to an embodiment.

In a sequence of FIG. 7, it is assumed that the user uses the moving body 10, by using the operation terminal 160 having the operation terminal ID which is not associated with their own user ID in the first information. In addition, it is assumed that the user ID of the user who uses the moving body 10 and the terminal information of the trusted user terminal 180 are not associated with each other in the third information.

In S710, the operation terminal 160 transmits the operation terminal ID to the moving body setting apparatus 100. In S720, the user selection unit 230 refers to the first information to select the user ID associated with the received operation terminal ID. As described above, the user ID of the user who uses the moving body 10 and the operation terminal ID of the operation terminal 160 in use are not associated with each other in the first information, and thus, the user ID selected in S720 is not the user ID of the user to use the moving body 10.

In S734, the user performs a user switching operation. For example, in S734, user list information is displayed on the display unit 290 based on the user information, and a user for a switching destination is selected. When the user who uses the moving body 10 selects an item corresponding to themself, a passcode entry screen is displayed on the display unit 290. When the user enters a correct passcode on the passcode entry screen, the update unit 210 associates the user ID of the user who uses the moving body 10, with the operation terminal ID of the operation terminal 160, in the first information. Accordingly, the user can update the first information by performing their own log-in to the moving body setting apparatus 100. In this manner, it is not necessary for the user to perform the operation again for associating the operation terminal ID of the operation terminal 160 with their own user ID.

When the user switching is completed in S734, the user selection unit 230 acquires the user ID currently in use in S736. In S738, the moving body setting unit 250 updates the user currently using the moving body 10. Specifically, the moving body setting unit 250 holds the user ID selected by the user selection unit 230 as that of the user currently using the moving body 10.

In S730, the Bluetooth connection is performed between the user terminal 180 and the moving body setting apparatus 100. The pairing is not completed between the user terminal 180 of the user who uses the moving body 10 and the moving body setting apparatus 100, and thus, the user ID selected by the user selection unit 230 and the terminal information of the user terminal 180 are not associated with each other, in the third authentication. Therefore, in S740, processing for registering the user terminal is executed. For example, the display unit 290 displays an inquiry over whether to register a newly connected user terminal 180 as a trusted device. When the user inputs a response with a message of the registration, the update unit 210 registers the terminal information of the new user terminal 180 in association with the user ID selected by the user selection unit 230, in the third information.

In S742, when the user turns on the power of the accessory, the moving body setting apparatus 100 detects that the power of the accessory is turned on, and causes the display unit 290 to display the home screen (S750). Through the home screen, the user is capable of the equipment setting, the user setting, or the like.

In S752, when detecting that the IG power is turned on, the moving body setting apparatus 100 reads the equipment setting corresponding to the user ID selected in S736. For example, the moving body setting unit 250 refers to the second information to read the setting information associated with the user ID selected in S736. In S762, the moving body setting unit 250 transmits the setting information read in S760 to the control apparatus 12. In S764, the control apparatus 12 sets the equipment based on the received setting information.

With the sequence described with reference to FIG. 7, when the moving body 10 is used by using the operation terminal 160 having the operation terminal ID which is not associated with their own user ID, it is possible to automatically associate the operation terminal 160 having the operation terminal ID, with their own user ID, by simply switching the user to use the moving body 10. Therefore, it is not necessary to perform a separate operation of associating the operation terminal 160 having the operation terminal ID, with their own user ID.

With the moving body setting system 5 described above, it is possible to reduce the trouble for the user when the association is updated between the operation terminal 160 and the user. Further, it is possible to use the operation terminal 160 and the user terminal 180, to smoothly perform the equipment setting without entering a passcode or the like. Further, when the user associated with the operation terminal 160 is deleted, it is not necessary to perform the operation for associating the operation terminal 160 with another user. In this way, with the moving body setting system 5, it is possible to reduce the troublesome operation in relation to associating the operation terminal 160 with the user.

In the embodiment described above, the moving body 10 is assumed to be a vehicle. However, any moving body other than the vehicle may be applied as the moving body 10.

Figure 8:
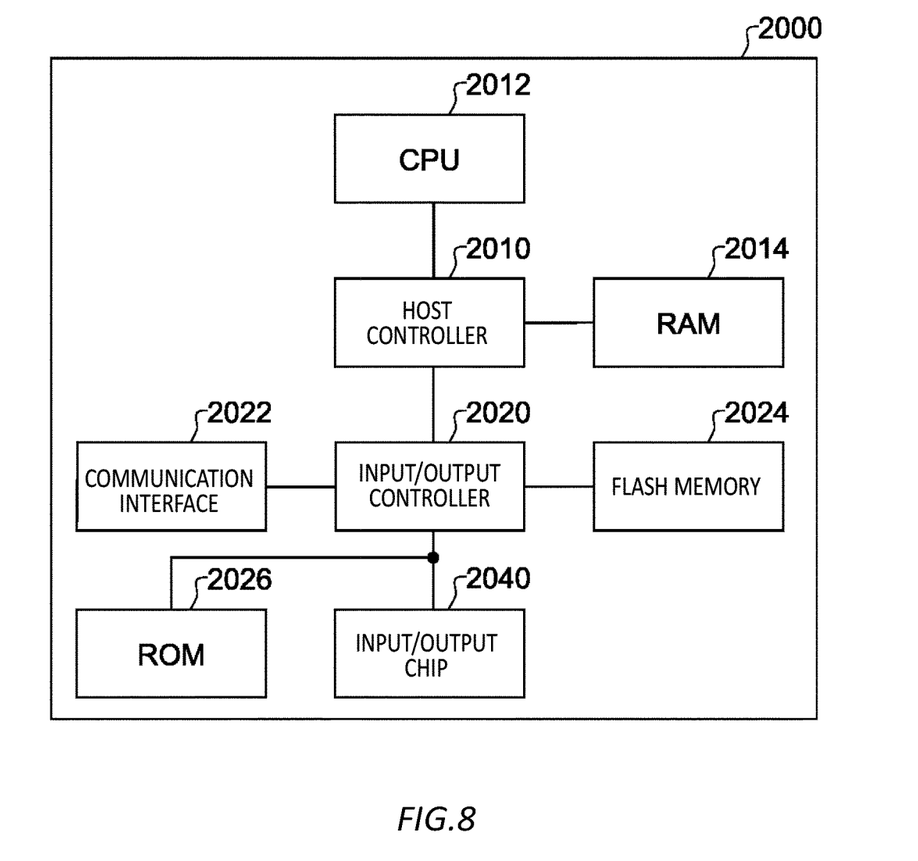
FIG. 8 shows an example of a computer 2000.

FIG. 8 shows an example of a computer 2000 where a plurality of embodiments of the present invention may be entirely or partially embodied. A program that is installed in the computer 2000 can cause the computer 2000 to: function as the moving body setting system 5 according to the embodiment or each unit of the system, or various apparatuses such as the moving body setting apparatus 100 or each unit of the apparatus; execute an operation associated with the system or each unit of the system, or the apparatus or each unit of the apparatus; and/or execute the process according to the embodiment or the steps of the process. Such a program may be executed by a CPU 2012 to cause the computer 2000 to perform certain operations associated with the processing procedures described herein and some of or all of the blocks in the block diagrams.

The computer 2000 according to the present embodiments includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. In addition, the input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. Programs are installed in the flash memory 2024, the RAM 2014, or the ROM 2026, and executed by the CPU 2012. The information processing written in these programs is read by the computer 2000, and thereby cooperation between a program and the above-described various types of hardware resources is achieved. An apparatus or method may be constituted by carrying out the operation or processing of information by using the computer 2000.

For example, when communication is carried out between the computer 2000 and an external device, the CPU 2012 may execute a communication program loaded onto the RAM 2014 to instruct the communication interface 2022 to perform communication processing, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or necessary portions of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, conditional judging, conditional branch, unconditional branch, search/replacement of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the preset condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

A program, which is installed on the computer 2000 and causes the computer 2000 to function as the moving body setting apparatus 100, may work on the CPU 2012 or the like to cause the computer 2000 to function as each unit of the moving body setting apparatus 100. The information processing written in these programs functions as each unit of the moving body setting apparatus 100 that is specific means by which software and the above-described various hardware resources cooperate by being read by the computer 2000. Then, by the specific means realizing calculation or processing of information in accordance with a purpose of use of the computer 2000 in the present embodiment, the unique moving body setting apparatus 100 in accordance with the purpose of use is constructed.

Various embodiments have been described by referring to the block diagrams and the like. Each block in the block diagrams may represent (1) steps of processes in which operations are performed or (2) units of apparatuses responsible for performing operations. Certain steps and units may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer-readable storage media may include any tangible device that can store instructions for execution by a suitable device, such that the computer-readable storage medium having instructions stored therein forms at least a portion of an article of manufacture including instructions which can be executed to create means for performing processing procedures or operations specified in the block diagrams.

Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or another programmable data processing apparatus, or to programmable circuitry, locally or via a local area network (LAN), a wide area network (WAN) such as the Internet, etc., to execute the computer-readable instructions to provide means for performing described processing procedure or operations specified in the block diagrams. An example of the processor includes a computer processor, a processing unit, a microprocessor, a digital signal processor, a controller, a microcontroller, or the like.

While the present invention has been described with the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

What is claimed is:

1. A moving body setting apparatus that is able to receive an operation terminal ID which is transmitted from an operation terminal holding the operation terminal ID, the moving body setting apparatus comprising:
   a storage unit that stores first information associating the operation terminal ID of the operation terminal with a user ID of a moving body, and second information associating the user ID with setting information of equipment included in the moving body;
   a user selection unit that selects a user of the moving body, based on a user switching instruction by a user operation, or based on the operation terminal ID received from the operation terminal, and the first information;
   a moving body setting unit that acquires, from the second information, setting information of the equipment associated with a user ID of a user selected by the user selection unit, and sets the equipment based on the acquired setting information; and an update unit that replaces, when an other user ID that is different from the user ID associated with the operation terminal ID in the first information is selected based on the user switching instruction by the user operation, the user ID which is associated with the operation terminal ID in the first information with the other user ID.

2. The moving body setting apparatus according to claim 1, the moving body being a vehicle.

3. A moving body comprising the moving body setting apparatus according to claim 1.

4. A moving body setting system comprising:
the moving body setting apparatus according to claim 1; and
the operation terminal.

5. A moving body setting apparatus that is able to receive an operation terminal ID which is transmitted from an operation terminal holding the operation terminal ID, the moving body setting apparatus comprising:
a storage unit that stores first information associating the operation terminal ID of the operation terminal with a user ID of a moving body, and second information associating the user ID with setting information of equipment included in the moving body;
a user selection unit that selects a user of the moving body, based on a user operation, or based on the operation terminal ID received from the operation terminal, and the first information;
a moving body setting unit that acquires, from the second information, setting information of the equipment associated with a user ID of a user selected by the user selection unit, and sets the equipment based on the acquired setting information; and
an update unit that updates, when switching of the user is performed by the user selection unit based on the user operation, a user ID which is associated with the operation terminal ID received from the operation terminal in the first information, with a user ID of a user after the switching, wherein
the storage unit stores user information which includes a plurality of user IDs of users, the user IDs being able to be associated with the operation terminal ID, and
when the user ID which is associated with the operation terminal ID in the first information is deleted from the user information, the update unit associates a predetermined default value with the operation terminal ID which is associated with the user ID that is deleted in the first information.

6. The moving body setting apparatus according to claim 5, wherein
when the operation terminal ID received from the operation terminal is associated with the default value in the first information, the moving body setting unit sets the equipment based on setting information associated with a user ID of a latest user who has used the moving body in the second information.

7. The moving body setting apparatus according to claim 6, wherein
when the operation terminal ID received from the operation terminal is associated with the default value in the first information, the update unit updates the user ID which is associated with the operation terminal ID received from the operation terminal in the first information, with a user ID of a latest user who has used the moving body.

8. The moving body setting apparatus according to claim 7, wherein
the storage unit further stores third information associating the user ID with a terminal ID of a mobile terminal authenticated in advance, and
on a condition that the moving body setting apparatus is connected to a mobile terminal that is identified by a terminal ID which is associated with the user ID of the user selected by the user selection unit in the third information, the moving body setting unit acquires, from the second information, the setting information of the equipment associated with the user ID of the user selected by the user selection unit, and sets the equipment based on the acquired setting information.

9. The moving body setting apparatus according to claim 6, wherein
the storage unit further stores third information associating the user ID with a terminal ID of a mobile terminal authenticated in advance, and
on a condition that the moving body setting apparatus is connected to a mobile terminal that is identified by a terminal ID which is associated with the user ID of the user selected by the user selection unit in the third information, the moving body setting unit acquires, from the second information, the setting information of the equipment associated with the user ID of the user selected by the user selection unit, and sets the equipment based on the acquired setting information.

10. The moving body setting apparatus according to claim 5, wherein
when the operation terminal ID received from the operation terminal is associated with the default value in the first information, the update unit updates the user ID which is associated with the operation terminal ID received from the operation terminal in the first information, with a user ID of a latest user who has used the moving body.

11. The moving body setting apparatus according to claim 10, wherein
the storage unit further stores third information associating the user ID with a terminal ID of a mobile terminal authenticated in advance, and
on a condition that the moving body setting apparatus is connected to a mobile terminal that is identified by a terminal ID which is associated with the user ID of the user selected by the user selection unit in the third information, the moving body setting unit acquires, from the second information, the setting information of the equipment associated with the user ID of the user selected by the user selection unit, and sets the equipment based on the acquired setting information.

12. The moving body setting apparatus according to claim 5, wherein
the storage unit further stores third information associating the user ID with a terminal ID of a mobile terminal authenticated in advance, and
on a condition that the moving body setting apparatus is connected to a mobile terminal that is identified by a terminal ID which is associated with the user ID of the user selected by the user selection unit in the third information, the moving body setting unit acquires, from the second information, the setting information of the equipment associated with the user ID of the user selected by the user selection unit, and sets the equipment based on the acquired setting information.

13. A moving body setting apparatus that is able to receive an operation terminal ID which is transmitted from an operation terminal holding the operation terminal ID, the moving body setting apparatus comprising:
- a storage unit that stores first information associating the operation terminal ID of the operation terminal with a user ID of a moving body, and second information associating the user ID with setting information of equipment included in the moving body;
- a user selection unit that selects a user of the moving body, based on a user operation, or based on the operation terminal ID received from the operation terminal, and the first information;
- a moving body setting unit that acquires, from the second information, setting information of the equipment associated with a user ID of a user selected by the user selection unit, and sets the equipment based on the acquired setting information; and
- an update unit that updates, when switching of the user is performed by the user selection unit based on the user operation, a user ID which is associated with the operation terminal ID received from the operation terminal in the first information, with a user ID of a user after the switching, wherein
- the storage unit further stores third information associating the user ID with a terminal ID of a mobile terminal authenticated in advance, and
- on a condition that the moving body setting apparatus is connected to a mobile terminal that is identified by a terminal ID which is associated with the user ID of the user selected by the user selection unit in the third information, the moving body setting unit acquires, from the second information, the setting information of the equipment associated with the user ID of the user selected by the user selection unit, and sets the equipment based on the acquired setting information.

14. A method that is executed by a moving body setting apparatus that is able to receive an operation terminal ID which is transmitted from an operation terminal holding the operation terminal ID, the method comprising:
- storing first information associating the operation terminal ID of the operation terminal with a user ID of a moving body, and second information associating the user ID with setting information of equipment included in the moving body;
- selecting a user of the moving body, based on a user switching instruction by a user operation, or based on the operation terminal ID received from the operation terminal, and the first information;
- acquiring, from the second information, setting information of the equipment associated with a user ID of a user selected in the selecting of the user of the moving body, and setting the equipment based on the acquired setting information; and
- when an other user ID that is different from the user ID associated with the operation terminal ID in the first information is selected based on the user switching instruction by the user operation, replacing the user ID which is associated with the operation terminal ID in the first information with the other user ID.

15. A non-transitory computer-readable storage medium having stored thereon a program that causes a computer to function as a moving body setting apparatus that is able to receive an operation terminal ID which is transmitted from an operation terminal holding the operation terminal ID, the program causing the computer to function as:
- a storage unit that stores first information associating the operation terminal ID of the operation terminal with a user ID of a moving body, and second information associating the user ID with setting information of equipment included in the moving body;
- a user selection unit that selects a user of the moving body, based on a user switching instruction by a user operation, or based on the operation terminal ID received from the operation terminal, and the first information;
- a moving body setting unit that acquires, from the second information, setting information of the equipment associated with a user ID of a user selected by the user selection unit, and sets the equipment based on the acquired setting information; and
- an update unit that replaces, when an other user ID that is different from the user ID associated with the operation terminal ID in the first information is selected based on the user switching instruction by the user operation, the user ID which is associated with the operation terminal ID in the first information with the other user ID.

* * * * *